3,076,810
PROCESS FOR THE PRODUCTION OF CYCLOHEXANONE
Raymond J. Duggan, West Seneca, Edward J. Murray, Buffalo, and Leon O. Winstrom, East Aurora, N.Y., assignors to Allied Chemical Corporation, New York, N.Y., a corporation of New York
No Drawing. Filed June 15, 1960, Ser. No. 36,136
7 Claims. (Cl. 260—586)

This invention relates to improvements in the production of cyclohexanone. More particularly it refers to a new and more efficient process for the catalytic hydrogenation of phenol to cyclohexanone.

It is well known to hydrogenate phenol to cyclohexanone in the presence of various catalysts. Palladium catalysts are perhaps the most efficient for carrying out this conversion since the production of undesirable by-products, notably cyclohexanol, can be held to a comparatively low figure. Thus U.S. Patent 2,829,166 discloses a process in which hydrogen is passed into a mass of molten phenol maintained at from 40° to 150° C. and under pressure not in excess of about 300 p.s.i.g., in the presence of a palladium catalyst. After the reaction period and removal of the catalyst, the desired cyclohexanone product is recovered as a distillation product leaving as bottoms a mixture comprising unreacted phenol and by-product cyclohexanol and high-boilers. Phenol and cyclohexanol, as is known, form an azeotropic mixture which constitutes a significant portion of the reaction product. The separation of this azeotrope and the recovery of phenol therefrom represents an expensive and bothersome problem when substantial quantities of cyclohexanol are present. Means have been proposed for the efficient separation of the azeotropic mixture as well as for the separation of the phenol and by-product cyclohexanol contained therein. In one instance, see U.S. Patent 2,829,166 noted above, the azeotropic mixture of phenol and cyclohexanol is submitted to a separate catalytic procedure employing a Raney nickel catalyst to convert the phenol into cyclohexanol. Such a procedure requires an additional hydrogenation process conducted under different conditions and necessitates a market for the cyclohexanol thus produced. Compounding the difficulty, the extended time required for the complete hydrogenation of the phenol places a definite limitation on the capacity of the apparatus.

An object of this present invention is to provide an efficient process for the substantially complete conversion of phenol into cyclohexanone. Another object is to provide a process for the rapid conversion of phenol into cyclohexanone. Other objects and advantages of the present invention will be obvious from the following description.

In accordance with the present invention cyclohexanone is produced by the hydrogenation of phenol in the presence of a catalyst containing palladium promoted by sodium in an amount of at least 1000 p.p.m., preferably about 4000–7000 p.p.m., based on the weight of the catalyst, at superatmospheric pressure and a temperature between 150° and 225° C. Substantially complete and selective conversion of the phenol is effected with the resultant product containing over 90% cyclohexanone, generally more than 95% cyclohexanone, about 1% or less unconverted phenol and less than about 4% of cyclohexanol.

We have made the surprising discovery, and our invention includes as a feature thereof, that the rate of hydrogenation of phenol to cyclohexanone is increased by the presence on the catalyst of sodium conveniently incorporated as sodium compound, preferably an inorganic sodium compound, e.g. sodium carbonate. We have found that amounts of such sodium of at least 1000 p.p.m. based on the weight of supported palladium catalyst used are required. Catalysts containing 7000 p.p.m. and more of sodium are effective in promoting this hydrogenation reaction. Larger quantities of as much as 1% or more of sodium had no further benefit on the reaction. Palladium catalysts are generally used in this reaction in the form of supported catalysts, i.e. the catalytic substance is dispersed on, or absorbed on the surface of, an inert material such as charcoal, aluminum oxide, or the like porous substances. The concentration of palladium in supported palladium catalyst is not critical but is usually in the range of from about 1% to about 10% of the weight of the catalyst. A satisfactory and commercially available catalyst contains 5% palladium on charcoal. The amount of such catalyst used in the hydrogenation reaction also is not critical and can vary from 0.025 to 1.0% or more of the weight of the phenol used. Preferably from 0.1 to 0.5% of catalyst, 5% palladium on charcoal is used.

Although in said U.S. Patent 2,829,166 it was said that temperatures in excess of 150° C. favored the formation of cyclohexanol, we have found that in the presence of our sodium promoted palladium catalyst not only is the reaction rate enhanced but also the production of cyclohexanol is not increased and in many instances is actually reduced by operating within the range of 150–225° C. The reason for this surprising discovery is not known with certainty and no attempt will be made to explain this fortuitous finding.

We have also found that the quality of the phenol used is a factor in obtaining comparable results. Impurities found in commercial phenols are capable of reducing catalyst activity and selectivity. Among such impurities can be mentioned, soluble iron, sulfur, halogen compounds, nickel, and free acids. In the instant process, we prefer to use a phenol having less than 1.0 p.p.m. of soluble iron, less than 10 p.p.m. of sulfur and less than 10 p.p.m. of halogen compound. Further the preferred phenol when dissolved in 50% by volume aqueous ethanol at a concentration of 16.5% by weight should have a pH of 4.6 or higher.

We have found further that the reaction rate can be increased by increasing the pressure. Although the hydrogenation can be run at low superatmospheric pressures, of the order of 5–15 p.s.i.g., we prefer to operate at between 35 and 150 p.s.i.g., as a matter of operating convenience. Higher pressures, 300 p.s.i.g. and more, can be used but the improvement in reaction rate is so slight as not to compensate for the additional effort and expense required to obtain such higher pressures.

The reduction reaction can be improved not only by the use of sodium promoted palladium catalysts but also by the presence of small quantities, preferably from 1 to about 10 p.p.m. (based on the weight of phenol), of inorganic alkaline reacting compounds, preferably sodium compounds and especially sodium hydroxide and sodium carbonate, in the reduction mixture. The addition of alkaline reactive compound to the reaction mixture is beneficial even in the best grade of commercial phenol presently obtainable.

Higher concentrations, i.e. more than 10 p.p.m. of the said alkaline reacting compound acts to alter the specificity of the sodium promoted catalyst. Thus additions of more than 10 p.p.m. of these alkaline reacting compounds causes an increase in the amount of cyclohexanol produced, and should be avoided.

The amounts of this additive are given in terms of metal moiety of the alkaline reacting compound. That is to say, that 1 to about 10 p.p.m. of sodium hydroxide refers to an amount of sodium hydroxide which contains 1 to 10 p.p.m. (based on the weight of phenol used) of sodium.

The preparation of the sodium promoted catalyst can be carried out in a number of ways. Preferably a slurry of the commercially available palladium catalyst in an aqueous solution of the sodium compound, e.g. sodium hydroxide, sodium carbonate and the like, is prepared and the slurry then is evaporated to dryness. Alternatively a dry mixture of the catalyst and sodium compound can be mixed and thoroughly blended in a suitable mill, as for example a ball mill.

Either continuous or batch techniques can be used in this improved process for hydrogenating phenol to cyclohexanone, the equipment used being that which is usual in such processes and is obvious to those skilled in this art. For example, batchwise hydrogenation can be efficiently carried out in a vertical cylindrical pressure vessel equipped with an efficient agitator and a suitable diffusion distributor at or near the bottom of the vessel. Heating and cooling is provided by means of coils or a vessel jacket. An inlet for phenol and dispersed catalyst is provided at or near the vessel bottom. A vent is provided at or near the top of the vessel for discharge of unconsumed hydrogen or inert gases if used. For continuous operation, a series of such pressure vessels can be provided, each being equipped with overflow discharge ports at preselected levels to permit control over residence time and hence over phenol conversion in each vessel. For batch operation, a dip leg located at a preselected level, preferably at or near the bottom is provided for product withdrawal. A distillation unit is provided with a fractionating column, either contiguous with or separated from the hydrogenation vessels for rectification of the product preferably after removal of the dispersed catalyst therefrom. For the catalyst removal, if required, a settling chamber or filter can be provided. Also a connection from the fractionation bottom to the hydrogenator for recycle of the residue preferably through a heater, flash evaporator and condenser interposed in said connecting line for removal of the high boiling by-product and delivery of essentially unchanged phenol to the reactor in liquid phase.

It has been found that when operating under preferred conditions, i.e. 150° to 225° C. and 35 to 150 p.s.i.g. using the sodium promoted catalyst and phenol of the quality defined above, the catalyst consumption is held to a surprising low figure and the used catalyst can be recovered and recycled almost indefinitely. In one batchwise series of runs, using 1 part of sodium promoted 5% palladium on charcoal catalyst (containing more than 1000 p.p.m. sodium) the catalyst was recovered and recycled six times without any appreciable change in product quality.

The following examples illustrate the process of our invention. Parts and percentages are by weight and temperatures are given in degrees centigrade.

EXAMPLE 1

A. A mixture of 1000 parts of phenol containing less than 1 p.p.m. of soluble iron, less than 10 p.p.m. of sulfur less than 10 p.p.m. combined halogen and a 16.5% solution of which in aqueous ethanol having a pH of 5.5, 0.01 part of sodium carbonate and 1 part of finely divided catalyst composed of 5% palladium on charcoal promoted with 5000 p.p.m. sodium, was charged to a stainless steel reaction vessel. The mass was heated to 185° C. and agitated at that temperature as hydrogen, was admitted through a diffuser located near the bottom of the vessel, and at a rate sufficient to maintain a pressure of 70 p.s.i.g. After 150 minutes the contents of the reactor were discharged through a filter to remove the dispersed catalyst. The filtrate contained 97.2% cyclohexanone, less than 0.5% phenol and the balance was substantially all cyclohexanol. The mass was distilled to yield cyclohexanone of excellent quality.

Repetition of this procedure but using 5 parts of the same sodium promoted palladium catalyst gave an equivalent crude cyclohexanone product after 20 minutes of reaction.

B. Repetition of the process described in part A above but using as catalyst 1 part of a 5% palladium on charcoal catalyst containing less than 1000 p.p.m. sodium gave a product containing less than 80% cyclohexanone and more than 10% of unreacted phenol.

C. A series of experiments conducted in the manner described in part A above, but to which various additions were made to the phenol, gave results as tabulated in Table I below.

*Table I*

| Expt. No. | Phenol addition | Hydrogenation time, mins. | Product quality | | |
|---|---|---|---|---|---|
| | | | Percent one | Percent ol | Percent phenol |
| 1 | >100 p.p.m. sulphur, >100 p.p.m. combined Cl. | 90 | <10 | | >90 |
| 2 | About 20 p.p.m. sulphur | 180 | 76 | 9 | 15 |
| 3 | About 30 p.p.m. Cl | 150 | 94 | 3 | 3 |
| 4 | About 10 p.p.m. soluble Fe | 180 | <30 | | >70 |

D. A series of runs made in the manner described in part A above, but using catalysts containing various amounts of sodium (as determined by flame spectroscopy) gave results as shown in Table II.

*Table II*

| Expt. No. | Na content of 5% pd. cat.[1] | Hydrogenation time, mins. | Product Analysis | | |
|---|---|---|---|---|---|
| | | | Percent one | Percent ol [2] | Percent phenol |
| 5 | 200 p.p.m. Na | 270 | <70 | | >10 |
| 6 | 300 p.p.m. Na | 240 | <70 | | >10 |
| 7 | 700 p.p.m. Na | 300 | 52 | 1 | 47 |
| 8 | 1,000 p.p.m. Na [3] | 265 | 97.3 | 1.9 | <0.5 |
| | 1,600 p.p.m. Na | 180 | 96.5 | 3 | <0.5 |
| 9 | 5,000 p.p.m. Na | 150 | 91.0 | 3 | <0.5 |
| 10 | 5,500 p.p.m. Na | 150 | 96.5 | 3.5 | <0.5 |

[1] Sodium content is an approximate figure.
[2] Includes cyclohexanol and high boiling by-products.
[3] Same catalyst as used in Ex. 7 but treated with aqueous sodium carbonate in amount sufficient to increase the sodium content to about 1,000 p.p.m.

The data in Table II plainly indicates the sensitivity of the catalysts containing sodium. Thus at a sodium content below 1000 p.p.m. the cyclohexanone production even at relatively long time cycles is exceedingly low, whereas at 1000 p.p.m. and above, cyclohexanone is rapidly produced.

EXAMPLE 2

A mixture consisting of 1000 parts of high quality phenol, 1 part of 5% palladium on charcoal containing about 5000 p.p.m. of sodium and 0.01 part of sodium carbonate was hydrogenated at 215° and 70 p.s.i.g. hydrogen pressure. After 90 minutes, the reaction was substantially complete and the crude product contained 97.2% cyclohexanone and less than 0.5% phenol.

EXAMPLE 3

In a hydrogenation carried out as in Example 2 above but at 185° and at 140 p.s.i.g., a product of similar quality was obtained in 90 minutes.

EXAMPLE 4

A hydrogenation carried out in analogous fashion to that described in Example 1, part A above, but from which the 0.01 part of sodium carbonate was omitted gave, after 180 minutes, a crude product which after removal of the catalyst, contained 91% cyclohexanone, 5% cyclohexanol and 4% phenol.

Analogous runs were made in which the concentration of sodium carbonate was varied. The results are tabulated in Table III below.

Table III

| Parts Na as Na₂CO₃/1,000 parts phenol | Hydrogenation time, mins. | Product quality | | |
|---|---|---|---|---|
| | | Percent one | Percent ol | Percent phenol |
| 0.03 | 150 | 91.5 | ¹8 | 0.5 |
| 2.00 | 150 | 19.5 | 80 | 0.5 |

¹ About.

EXAMPLE 5

This experiment demonstrates the feasibility of recovering and reusing the sodium promoted hydrogenation catalyst.

A series of batch hydrogenation runs was made in the maner described in Example 1, part A, above. In this series the catalyst charge (1 part/1000 parts of phenol) was recovered by filtration after the completion of the hydrogenation and recycled without further treatment to the succeeding batch run. The pertinent data, from this series of runs, is contained in Table IV below.

Table IV

| Catalyst cycle | Hydrogenation time, mins. | Product quality | | |
|---|---|---|---|---|
| | | Percent one | Percent ol | Percent phenol |
| 1 | 150 | 97.3 | 2.7 | <0.5 |
| 2 | 150 | 98.3 | 1.7 | <0.5 |
| 3 | 150 | 96.2 | 3.8 | <0.5 |
| 4 | 160 | 95.8 | 4.0 | <0.5 |
| 5 | 240 | 97.3 | 2.7 | <0.5 |
| 6 | 265 | 98.15 | 1.85 | <0.5 |

EXAMPLE 6

This experiment illustrates the feasibility of continuous hydrogenation in the presence of a sodium promoted catalyst.

The first of a series of three similar hydrogenation vessels was charged with phenol and 5% palladium on charcoal catalyst promoted with 5000 p.p.m. of sodium. Each of the vessels was connected to the adjacent vessel by means of an over-flow line. The reaction mass emanating from the third vessel was directed to a continuous separator wherein the catalyst was removed from the crude product which then was run to storage pending rectification. The recovered catalyst was held for recycle.

Reduction was effected by means of synthesis gas consisting of 3 parts (by volume) of hydrogen and 1 part (by volume) of nitrogen and was fed counter-currently to the flow of phenol.

In operation, the phenol feed was adjusted to a rate of 10,000 parts/hour; catalyst was fed with the phenol at the rate of 10 to 15 parts/hr. and 0.1 part/hr. of sodium carbonate was admitted also.

The temperature of the hydrogenation was maintained between 185° and 195°, the pressure between 135 and 145 p.s.i.g., controlled by the rate of feed of the synthesis gas. Flow of reactants was such as to provide a residence time of approximately nine hours under average operating conditions.

The operation was carried out for a period of several days and analysis of the crude product after separation of catalyst indicated that the cyclohexanone content was above 96% after equilibrium conditions were obtained.

It can be thus seen that an improved and highly effective novel process has been devised for the hydrogenation of phenol to cyclohexanone.

Although several specific embodiments of the invention have been described in the above illustrative examples, it will be obvious to those skilled in this art that various modifications in the details set out therein can be made without departing from the scope or spirit of our invention. For example, the sodium promoted palladium catalyzed hydrogenation of phenol to cyclohexanone can be effected while the phenol is present as a solution in a solvent which is substantially inert, at least to hydrogen or to phenol and cyclohexanone. Such a suitable solvent is tetrahydronaphthalene which permits the attainment of higher reaction velocities without interfering with the selectivity of the catalyst to produce cyclohexanone.

We claim:

1. The process of producing cyclohexanone comprising hydrogenating phenol by passing hydrogen in contact with phenol in the presence of a palladium catalyst promoted by sodium in an amount of at least 1000 p.p.m. based on the weight of the catalyst, at superatmospheric pressure and a temperature above 150° to 225° C. and recovering preponderantly cyclohexanone as a product.

2. Process according to claim 1 wherein the amount of sodium is between about 4000–7000 p.p.m.

3. Process according to claim 1 wherein the palladium catalyst is promoted by the incorporation of sodium carbonate.

4. Process according to claim 1 wherein the palladium catalyst is promoted by the incorporation of sodium hydroxide.

5. Process according to claim 1 wherein the phenol contains less than 1.0 p.p.m. of soluble iron, less than 10 p.p.m. of sulfur, less than 10 p.p.m. of halogen, and further the phenol when dissolved in 50% by volume aqueous alcohol at a concentration of 16.5% by weight has a pH of at least 4.6.

6. Process according to claim 1 wherein the hydrogenation reaction is effected in the presence of a small amount of an inorganic alkaline reacting compound selected from the group consisting of sodium hydroxide and sodium carbonate, said amount being about 1 to about 10 p.p.m. in terms of metal moiety of the inorganic alkaline reacting compound based on the weight of phenol.

7. The process of producing cyclohexanone comprising hydrogenating phenol containing less than 1.0 p.p.m. of soluble iron, less than 10 p.p.m. of sulfur, less than 10 p.p.m. halogen, and further the phenol when dissolved in 50% by volume aqueous ethanol at a concentration of 16.5% by weight should have a pH of at least 4.6, by passing hydrogen in contact with the phenol in the presence of about 1 to about 10 p.p.m. of an inorganic alkaline reacting compound selected from the group consisting of sodium hydroxide and sodium carbonate based on the weight of phenol in terms of metal moiety of the inorganic alkaline reacting compound, and in the presence of a palladium catalyst promoted by sodium in an amount of at least 1000 p.p.m. based on the weight of the catalyst, at superatmospheric pressure and a temperature above 150° to 225° C. and recovering preponderantly cyclohexanone as a product.

References Cited in the file of this patent

UNITED STATES PATENTS

| 2,829,166 | Joris et al. | Apr. 1, 1958 |
| 2,857,432 | Joris | Oct. 21, 1958 |